United States Patent Office 3,048,545
Patented Aug. 7, 1962

3,048,545
HYDRAULIC FLUID COMPOSITIONS
Stuart Walter Critchley, Hale Barns, and Frank Lamb, Chadderton, Oldham, England, assignors to J. R. Geigy A.-G., Basel, Switzerland
No Drawing. Filed Oct. 19, 1960, Ser. No. 63,470
Claims priority, application Great Britain Oct. 20, 1959
20 Claims. (Cl. 252—78)

The present invention relates to improved compositions especially applicable as hydraulic fluids and as lubricants.

Hydraulic fluids are used for a wide variety of purposes as, for example, in hydraulic machinery employed in foundries and in the steel industry generally. A growing outlet is provided by the hydraulic systems of aircraft and an important requisite of hydraulic fluids used in power transmission systems, especially in aircraft, is non-flammability. In addition to this primary characteristic, other desiderata are that the composition should exhibit a low rate of change of viscosity with temperature, satisfactory lubricity and low attack on rubber over a wide range of operating tempeartures. Further desirable properties for hydraulic fluids are an ability to resist oxidation, to show minimal corresivity to metal surfaces and adequate stability to hydrolysis.

To combine all the several features which are desirable in a hydraulic fluid, especially if used in the operation of aircraft, presents great difficulty. Thus, the aryl phosphates, such as tricresyl phosphate, although they are relatively non-inflammable, prove to have unsatisfactory viscosity/temperature relationships over a wide range, and high attack on natural and most synthetic rubber sealing materials.

According to the present invention, a hydraulic fluid composition consists essentially of a blend of at least one liquid phosphonate of the general formula:

$$R_1P(O)(OR_2)_2$$

wherein $R_1$ and $R_2$ represent alkyl groups containing from 1 to 16 carbon atoms, which may be the same or different with at least one normally liquid end-stopped alkyl aryl siloxane polymer having a plurality of halogen atoms as substituents in the aryl nuclei, the proportion of such halogenated siloxane polymer being from 5 to 95 percent by weight of the whole blend. It will be understood that, for economic reasons, low percentages of the halogenated siloxane polymer are desirable.

Preferably, the composition contains from 10 percent to 50 percent, most suitably from 15 percent to 35 percent, by weight of the halogenated siloxane polymer.

The phosphonates employed in the compositions of the present invention are referred to as dialkyl alkyl-phosphonates.

The alkyl groups represented by $R_1$ and $R_2$ in the phosphonates of general Formula I may be straight-chain or branched-chain. Examples of such alkyl groups are methyl, ethyl, n-propyl, isopropyl, n-butyl, isobutyl, tert.-butyl, n-amyl, isoamyl, n-hexyl, 1-methyl-n-pentyl, 2-methyl-n-pentyl, 4-methyl-n-pentyl 1,3-dimethyl-n-butyl, 2,3-dimethyl-n-butyl, 2-ethyl-n-butyl, 1,2-diethyl-n-propyl, 2,2,3-trimethyl-n-butyl, 1,4-dimethyl-n-pentyl, 2,4-dimethyl-n-pentyl, 3,4-dimethyl-n-pentyl, 3,5-dimethyl-n-pentyl, 1-ethyl-n-pentyl, 2-ethyl-n-pentyl, 1-methyl-n-hexyl, 2-methyl-n-hexyl, 5-methyl-n-hexyl, 2,4-dimethyl-3-ethyl-n-butyl, 2,2,4-trimethyl-n-pentyl, 2-n-propyl-3,5-dimethyl-n-butyl, 2-isopropyl-3,3-dimethyl-n-butyl, 2,2,4,4-tetramethyl-n-pentyl, 1,3,4-trimethyl-n-hexyl, 1,5,5-trimethyl-n-hexyl, 3,5,5-trimethyl-n-hexyl, 1,4-dimethyl-n-heptyl, 1,5-dimethyl-n-heptyl, 1,6-dimethyl-n-heptyl, 3,3-dimethyl-n-heptyl, n-undecyl, n-dodecyl, n-tridecyl and cetyl. Examples of suitable dialkyl alkyl-phosphonates are di-2-ethyl-hexyl-n-decyl-phosphonate and di-n-octyl-n-butyl-phosphonate, di-osoamyl isoamyl phosphonate and bis-n-tridecyl n-tridecyl phosphonate.

A preferred halogenated siloxane polymer for use in the invention is the trimethyl polychlorophenyl methyl siloxane of viscosity 60 centistokes at a temperature of 100° C., sold under the trade name "Silicone Fluid DP 47" by Imperial Chemical Industries Limited, England. This is a trimethylsilyl-end-stopped dimethyl polysiloxane having some methyl groups replaced by tetrachlorophenyl groups and some replaced by trimethylsiloxy groups.

Advantageously, the composition may contain an antioxidant of the amine or phenolic type. Such antioxidants include mono-, di- and tri-hydric phenols, such as catechol, quinol and rufigallo, alkyl- and alkoxy-substituted phenols, such as homocatechol, guaiacol, eugenol and 2,6-di-tert.-butyl-4-methylphenol, bis phenols such as 2,2'-methylene-bis(4-methyl-6-tert.-butylphenol), and o-phenylenediamine, β-naphthylamine, aniline and phenyl-α-naphthylamine. The amount of antioxidant required is quite small, usually less than 5% and preferably less than 2% by weight of the composition. Amounts from 0.1% to 1% e.g. 0.5% by weight of the composition are generally most suitable.

Especially suitable antioxidants are phenyl-α-naphthylamine and 2,6-di-tert.-butyl-4-methylphenol.

Conventional corrosion inhibitors such as benzotriazole may also be included in the composition, if desired, preferably in an amount from 0.01% to 2% by weight of the composition.

The following examples illustrate, but do not limit, the composition of the invention:

EXAMPLE 1

Di-2-ethylhexyl n-decyl-phosphonate __ 85% weight.
Silicone fluid DP 47 _____ 15% weight.
Phenyl-α-naphthylamine _____ 0.5% weight, calculated on the blend.

The composition was prepared by stirring the Silicone Fluid DP 47 into the di-ethylhexyl n-decyl phosphonate at ordinary temperatures and the antioxidant incorporated at 30–40° C. A homogeneous liquid was obtained. The blend had the following properties:

Kinematic Viscosity

| | Cs. |
|---|---|
| 210° F | 3.71 |
| 100° F | 13.98 |
| −40° F | 1,295 |
| −65° F | 6,533 |

A.S.T.M. slope (i.e. the slope of the curve plotted between any two temperatures on A.S.T.M. viscosity-temperature chart D341) over the range 100 to 210° F., 0.671.

The unblended di-2-ethylhexyl n-decyl-phosphonate was found to have an A.S.T.M. slope figure of 0.759, which compares unfavourably with the composition blended in accordance with the invention. The distinct improvement in the viscosity/temperature relationship which is obtained by incorporating with the phosphonate the halogenated siloxane polymer is thereby rendered apparent.

Lubricity

The lubricity of the blend was measured in a precision Shell Four-Ball wear tester (1½-inch grade A SKF steel ball bearings). The wear-scar diameter was found to be 0.221 mm. at the conclusion of a 30-minute test at an ambient temperature of 21° C., 1.0 kg. load and 1,420 r.p.m. This is superior to the wear-scar diameter of 0.309 mm. obtained in a test of a typical proprietary non-flammable phosphate-based hydraulic fluid carried out under identical conditions. With a 40 kg. load, maintaining all the other factors constant, the respective wear-scar diameters proved to be 0.604 mm. for the blend and 0.801 mm. for the same proprietary hydraulic fluid. These scar diameters are such that satisfactory operation in gear or vane type hydraulic pumps can be expected.

*Inflammability*

The test adopted was as follows:
Approximately 10 ml. of the fluid are poured into a glass dish about ½-inch deep and 2½ inch diameter. A wick of glass wool previously washed with petroleum ether (b.p. 60–80° C.) and dried at 100° C. is wetted with the fluid, shaped approximately in the form of a cone about 1½ inch base diameter and 1¼ inch high and placed in the centre of the dish. A Bunsen burner flame, 6 inches long and adjusted so that the sharp inner cone is just present, is applied to the tip of the wick for 30 seconds and then removed. The behaviour of the wick is then observed. On applying this test to the blend of the example, the composition continued to burn for a maximum of 8 seconds after removal of the Bunsen flame. By contrast, a typical proprietary non-flammable phosphate-based hydraulic fluid, when examined under the same conditions, was found to burn freely. It should also be emphasized that the unblended phosphonate similarly remained unextinguished on being subjected to this test, thus demonstrating an important advantage gained by incorporating into the phosphonate a halogenated silicone product in accordance with this invention.

*Effect on Rubber*

A feature of obvious importance is that a hydraulic fluid which may come into contact with hydraulic seals, gaskets, flexible hoses and the like used in or in connection with aircraft, shall not have deleterious effects thereon. It has been found that, on testing in accordance with the following procedure, a number of standard synthetic rubbers did not undergo any appreciable change in volume on immersion in the phosphonate blend of this example.

A 1" x 1" square of rubber 1/16" thick is weighed in air to the nearest milligram (W1) and then weighed again to the nearest milligram in water (W2). The test piece is washed with ethyl alcohol, blotted with filter paper and then laid flat in a 50 ml. lipless beaker. The minimum amount of fluid necessary to immerse the rubber completely is poured into the beaker which is then loosely corked and placed in an oven maintained at 110° C.±1° C. After 150 hours, the test piece is removed from the hot fluid, cooled to room temperature in air for 30 minutes, quickly washed with ethyl alcohol and blotted with filter paper. The rubber is weighed in air (W3) and then in water at room temperature (W4).

The percentage change in volume is then calculated from the formula:

Percent change in volume
$$= \frac{(W3-W4)-(W1-W2)}{(W1-W2)} \times 100$$

The rubber samples are suspended by means of a thin wire during all the weighings, fastening being achieved by making a small perforation in one corner of the rubber specimen. The difference in weights of the wire in air and when partially immersed in water is neglected. The actual weight of the wire need not be obtained since weight differences are involved.

This advantage is clearly shown in the following table which reproduces comparative data with respect to (a) the blended phosphonate hydraulic fluid of Example 1 and (b) a typical proprietary non-flammable phosphate-based hydraulic fluid. In each of the five comparative tests reproduced below, the data refer to specimens cut from the same sheet of rubber.

TABLE I

| Specification | Rubber Type | Percentage Change In Volume | |
|---|---|---|---|
| | | Composition of Example 1 | Proprietary phosphate-based hydraulic fluid |
| DTD 458A (Grade B). | butadiene/acrylonitrile copolymer (32% acrylonitrile). | +2.83 | +177.4 |
| DTD 458A (Grade A). | ___do___ | +7.16 | +274.7 |
| DTD 5509 (Grade A). | butadiene/acrylonitrile copolymer (38% acrylonitrile). | +3.83 | +124.8 |
| DTD 5509 (Grade B). | ___do___ | +2.11 | +194.9 |
| DTD 458A/1 | butadiene/acrylonitrile copolymer (37% acrylonitrile). | +8.83 | +455.2 |

EXAMPLE 2

Di-n-octyl n-butyl-phosphonate _____ 85% weight.
Silicone Fluid DP 47 _____ 15% weight.
Phenyl-α-naphthylamine _____ 0.5% weight,
calculated on the blend.

The composition was prepared by stirring the Silicone Fluid DP 47 into the di-n-octyl n-butyl-phosphonate at ordinary temperatures and the antioxidant incorporated at 30–40° C. A homogeneous liquid was obtained. The blend had the following properties:

*Kinematic Viscosity*

| | Cs. |
|---|---|
| 210° F | 2.76 |
| 100° F | 9.14 |
| −40° F | 469.3 |
| −65° F | 1990 |

A.S.T.M. slope determined over the range 100 to 210° F., 0.689. The unblended di-n-octyl n-butyl-phosphonate was found to have an A.S.T.M. slope figure of 0.786.

*Lubricity*

Determined as in Example 1.
The wear-scar diameter was found to be 0.166 mm. at the conclusion of a 30-minute test at an ambient temperature of 21° C. 1.0 kg. load and 1,420 r.p.m. With a 40 kg. load, maintaining all the other factors constant, the wear-scar diameter proved to be 0.736 mm. It will be seen that when compared with the values given under Example 1 for a typical proprietary non-flammable phosphate-based hydraulic fluid, these values are very favourable.

*Inflammability*

The wick ignition test used in Example 1 was employed as a standard and it was found that after removal of the Bunsen flame, the composition continued to burn for a maximum of 5 seconds, whereas the unblended phosphonate of this example and the proprietary phosphate-based hydraulic fluid used as controls in the manner stated in Example 1 continued to burn freely.

*Effect on Rubber*

On examining the effect of the blend of Example 2 upon a series of standard synthetic rubbers, the following comparative data were obtained: In each of the three comparative tests reproduced below, the data refer to specimens cut from the same sheet of rubber:

TABLE II

| Specification | Rubber Type | Percentage Change In Volume | |
|---|---|---|---|
| | | Composition of Example 2 | Proprietary phosphate-based hydraulic fluid |
| DTD 565 (Grade A). | butadiene acrylonitrile copolymer (38% acrylonitrile). | +5.37 | +124.7 |
| DTD 565 (Grade B). | ----do---- | +4.08 | +180.6 |
| DTD 5509 (Grade A). | ----do---- | +10.98 | +124.8 |

The above table demonstrates strikingly the relatively insignificant effect which a composition, made in accordance with Example 2 has on the swelling of standard types of synthetic rubber, when compared with the effect of a proprietary phosphate-based hydraulic fluid.

EXAMPLE 3

Percent weight
Di-isoamyl isoamyl-phosphonate_____ 90
Silicone Fluid DP 47_____ 10
Phenyl α-naphthylamine_____ [1] 0.5
Benzotriazole (as corrosion inhibitor)_____ [1] 0.1

[1] Calculated on the blend.

The composition was prepared as described under Example 1. The blend so obtained had the following properties:

*Kinematic Viscosity*

Cs.
210° F_____ 1.94
100° F_____ 6.03
−40° F_____ 364.5
−65° F_____ 1,549

A.S.T.M. slope determined over the range 100 to 210° F., 0.784. The unblended di-isoamyl, isoamyl phosphonate was found to have an A.S.T.M. slope figure of 0.902.

*Lubricity*

Determined as in Example 1.
The wear-scar diameter was found to be 0.248 mm. at the conclusion of a 30-minute test at an ambient temperature of 21° C., 1.0 kg. load and 1420 r.p.m. With a 40 kg. load, maintaining all the other factors constant, the wear-scar diameter proved to be 0.910 mm. These values compare favourably with the data under Example 1 for a typical proprietary non-flammable phosphate-based hydraulic fluid.

*Inflammability*

The wick ignition test used in Example 1 was employed as a standard and it was found that, after removal of the Bunsen flame, the composition continued to burn for a maximum of 15 seconds, whereas the unblended phosphonate of this example continued to burn for 110 seconds, when examined under the same conditions and the proprietary hydraulic fluid burned freely.

*Effect on Rubber*

On examining the effect of the blend of Example 3 upon a series of standard synthetic rubbers, the following comparative data were obtained. In each of the comparative tests reproduced below, the data refer to specimens cut from the same sheet of rubber:

TABLE III

| Specification | Rubber Type | Percentage Change In Volume | |
|---|---|---|---|
| | | Composition of Example 3 | Proprietary phosphate based hydraulic fluid |
| DTD 565 (Grade A). | butadiene/acrylonitrile copolymer (38% acrylonitrile) | +31.1 | +125 |
| DTD 565 (Grade B). | ----do---- | +40.2 | +181 |
| DTD 458A (Grade B). | butadiene/acrylonitrile copolymer (32% acrylonitrile). | +163 | +177 |
| DTD 458A (Grade A). | ----do---- | +103 | +275 |
| DTD 5509 (Grade A). | butadiene/acrylonitrile copolymer (38% acrylonitrile). | +38.9 | +125 |
| DTD 458A (Grade 1A) | butadiene/acrylonitrile copolymer. | +65.0 | +243 |

The above table clearly demonstrates the markedly favourable effect which a composition, made in accordance with Example 3, has in limiting the swelling of standard types of synthetic rubber, when compared with the effect of a proprietary phosphate-based hydraulic fluid.

EXAMPLE 4

Percent by weight
Bis-n-tridecyl n-tridecyl-phosphonate_____ 65
Silicone Fluid DP 47_____ 35
Phenyl-α-naphthylamine _____ [1] 0.5
Benzotriazole (as corrosion inhibitor)_____ [1] 0.1

[1] Calculated on the blend.

The composition was prepared as described under Example 1 and the blend thus obtained had the following properties:

*Kinematic Viscosity*

210° F_____cs__ 9.81
100° F_____cs__ 53.81
−40° F_____ Solid
−65° F_____ Solid

*A.S.T.M. Slope*

It is to be noted that, while the blend of this example was solid at −40° F., its A.S.T.M. slope, determined over the range 100° F. to 240° F., was eminently satisfactory at 0.589. This compares with a value of 0.739 for the unblended bis-tridecyl, tridecyl phosphonate.

*Lubricity*

Determined as in Example 1.
The wear-scar diameter was found to be 0.165 mm. at the conclusion of a 30-minute test at an ambient temperature of 21° C., 1.0 kg. load and 1420 r.p.m. With a 40 kg. load, maintaining all the other factors constant, the wear-scar diameter proved to be 0.648 mm. These values compare favourably with the data in Example 1 for the typical proprietary non-flammable phosphate-based hydraulic fluid.

*Inflammability*

The wick ignition test used in Example 1 was employed as a standard and it was found that, after removal of the Bunsen flame, the composition continued to burn for a maximum of 7 seconds, whereas the unblended phosphonate of this example and the proprietary hydraulic fluid continued to burn freely.

*Effect on Rubber*

On examining the effect of the blend of Example 4 upon a series of standard synthetic rubbers, the following comparative data were obtained. In each of the comparative tests reproduced below, the data refer to specimens cut from the same sheet of rubber. It will be noted that in all but one of the trials relating to the blend of this example, very slight shrinkage of the rubber occurred which, however, was insufficiently in evidence to be detrimental.

| Specification | Rubber Type | Percentage Change In Volume | |
|---|---|---|---|
| | | Composition of Example 4 | Proprietary phosphate based hydraulic fluid |
| DTD 565 (Grade A). | butadiene/acrylonitrile copolymer (38% acrylonitrile). | −3.99 | +125 |
| DTD 458A (Grade B). | butadiene/acrylonitrile copolymer (32% acrylonitrile). | −3.79 | +177 |
| DTD 458A (Grade A). | ___do___ | −3.11 | +275 |
| DTD 552 (Grade B). | Neoprene GN | +47.2 | (¹) |
| DTD 5509 (Grade A). | butadiene/acrylonitrile copolymer (38% acrylonitrile). | −1.01 | +125 |
| DTD 458A (Grade 1A). | butadiene/acrylonitrile copolymer. | −1.08 | +243 |

¹ Rubber disintegrated.

The Silicone Fluid DP 47 used in any of the foregoing examples may be replaced by a corresponding amount of another normally liquid end-stopped alkyl aryl siloxane polymer having a plurality of halogen atoms, such as chlorine atoms, as substituents in the aryl nuclei, with similar results.

The phosphonate used in any of the foregoing examples may be replaced by a corresponding amount of any of the other phosphonates of the general formula hereinbefore given, with similar results.

The phenyl-α-naphthylamine used in any of the foregoing examples may be replaced by a corresponding amount of another antioxidant of the amine or phenolic type, such as one of those hereinbefore listed, with similar results.

Below are given details of tests made to determine the performance of the composition according to Example 1 when used in a pump working at a pressure of 4000 p.s.i.g. and a speed of 3000 r.p.m. over a total period of 100 hours, viz.: 50 hours at 90° C. followed by 50 hours at 110° C.

The following table illustrates the average wear of certain of the pump components under the conditions stated above.

Corresponding data are given for a hydraulic fluid in commercial use, and it will be seen that the blend of Example 1 compares favourably in this test with the reference material.

| Component of Pump | Average Change in Dimension (Inches) (Negative sign means apparent metal growth). | | Average Loss in Weight (Grammes) (Negative Sign means apparent Increase in Weight). | |
|---|---|---|---|---|
| | Commercially-available hydraulic fluid | Blend of Example 1 | Commercially-available hydraulic fluid | Blend of Example 1 |
| Plunger | 0.00007 | −0.00003 | 0.00072 | 0.00216 |
| Cylinder | −0.00003 | 0.000004 | −0.0008 | 0.0034 |
| Pin | 0.00008 | 0.00007 | 0.0022 | 0.00222 |
| Shoe | 0.0004 | −0.0006 | 0.0190 | 0.00604 |

That the blend of Example 1 exhibits a low rate of change of viscosity and develops negligible acidity, when used in a pump under the stated conditions will be apparent from the following figures:

| Time Factor | Viscosity at 100° F. (cs.) | Acid Value (mg. KOH/gm.) |
|---|---|---|
| Before Test | 14.1 | 0.01 |
| After 67 Hours | 13.9 | 0.04 |
| After 100 Hours | 14.0 | 0.04 |

*Foaming Characteristics*

The composition made according to Example 1 was examined for foaming characteristics by utilising the procedure given in Specification I.P. 146/55T which, in outline, is as follows: The sample, maintained at a temperature of 75° F. (24° C.) is blown with air at a constant rate for 5 minutes, then allowed to settle for 10 minutes. The volume of foam is measured at the end of both periods. The test is repeated on a second sample at 200° F. (93.3° C.) and then, after collapsing the foam, at 75° F. (24° C.).

It was found that the volume of foam after 10 minutes settling period was nil.

*Resistance to Corrosion and Oxidation*

A hydraulic fluid having the composition given in Example 1 and containing, as specimens, small pieces of metal, was heated in a glass test tube at 121° C. for 168 hours. During the period of heating, dry air was passed into the fluid at the rate of 5 litres per hour.

The data in the table illustrate the beneficial effect of adding a minor amount of benzotriazole to the blend of Example 1. It will be noted that the blend containing benzotriazole exhibited a lessened attack on copper, a feature that is especially significant in a hydraulic fluid composition, since bronze filters are commonly used in the hydraulic systems of aircraft. Moreover, the results clearly show that the development of acidity is reduced and the formation of sludge prevented.

| | Blend used | |
|---|---|---|
| | Blend of Example 1 | Blend of Example 1 +0.25 parts by wt. benzotriazole |
| Metal wt. change (mg./cm.²): | | |
| Cadmium plated steel | nil | −0.02 |
| Low carbon steel | +0.08 | −0.04 |
| Copper | −1.79 | +0.03 |
| Aluminium alloy | +0.12 | −0.01 |
| Magnesium alloy | +0.08 | nil |
| Change in viscosity of material at 100° F | +4.33 | +4.15 |
| Increase in neutralisation value (mg. KOH g.) | 1.55 | 0.10 |
| Appearance of the material at conclusion of test | (¹) | (²) |

¹ Sludge present.
² No sludge present.

What we claim is:
1. A hydraulic fluid composition consisting essentially of a blend of (1) at least one liquid phosphonate of the general formula:

$$R_1P(O)(OR_2)_2$$

wherein $R_1$ is an alkyl radical containing 1 to 16 carbon atoms, $R_2$ is an alkyl radical containing 1 to 16 carbon atoms, and (2) at least one end-stopped alkyl aryl siloxane polymer having a plurality of halogen atoms as substituents in the aryl nuclei, the proportion of such halogenated siloxane polymer being from 5 to 95 percent by weight of the composition.

2. A hydraulic fluid composition as defined in claim 1 which contains from 10 to 50 percent by weight of the halogenated siloxane polymer.

3. A hydraulic fluid composition as defined in claim 2 which contains from 15 to 35 percent by weight of the halogenated siloxane polymer.

4. A hydraulic fluid composition as defined in claim 1 which contains an antioxidant selected from the group consisting of an amine and a phenol.

5. A hydraulic fluid composition as defined in claim 4 in which the antioxidant is phenyl-α-naphthylamine.

6. A hydraulic fluid composition as defined in claim 4 in which the antioxidant is 2,6-di-tert. butyl-4-methyl-phenol.

7. A hydraulic fluid composition as defined in claim 4 in which the amount of antioxidant is from 0.1 percent to 1 percent by weight of the composition.

8. A hydraulic fluid composition as defined in claim 1 which contains a corrosion inhibitor.

9. A hydraulic fluid composition as defined in claim 8 in which the corrosion inhibitor is benzotriazole.

10. A hydraulic fluid composition as defined in claim 8 in which the amount of corrosion inhibitor is from 0.01 percent to 2 percent by weight of the composition.

11. A hydraulic fluid composition as defined in claim 4 which contains a corrosion inhibitor.

12. A hydraulic fluid composition as defined in claim 4 in which the corrosion inhibitor is benzotriazole.

13. A hydraulic fluid composition as defined in claim 4 in which the amount of corrosion inhibitor is from 0.01 percent to 2 percent by weight of the composition.

14. A hydraulic fluid composition as defined in claim 5 in which the liquid phosphonate is di-2-ethylhexyl-n-decyl-phosphonate.

15. A hydraulic fluid composition as defined in claim 5 in which the liquid phosphonate is di-n-octyl-n-butyl-phosphonate.

16. A hydraulic fluid composition as defined in claim 5 which contains a corrosion inhibitor.

17. A hydraulic fluid composition as defined in claim 16 in which the corrosion inhibitor is benzotriazole.

18. A hydraulic fluid composition as defined in claim 17 in which the liquid phosphonate is di-isoamyl-isoamyl-phosphonate.

19. A hydraulic fluid composition as defined in claim 17 in which the liquid phosphonate is bis-n-tridecyl-n-tridecyl-phosphonate.

20. A hydraulic fluid composition as defined in claim 1 in which the siloxane polymer is trimethyl polychlorophenyl methyl siloxane.

References Cited in the file of this patent

UNITED STATES PATENTS

| | | |
|---|---|---|
| 2,684,336 | Moreton | July 20, 1954 |
| 2,689,859 | Burkhard | Sept. 21, 1954 |
| 2,811,540 | Copper | Oct. 29, 1957 |
| 2,877,184 | Ragborg | Mar. 10, 1959 |

FOREIGN PATENTS

| | | |
|---|---|---|
| 529,743 | Canada | Aug. 28, 1956 |